Dec. 14, 1965 H. RICKENBACH 3,223,020
VALVE MECHANISM PARTICULARLY ADAPTED FOR SHELTERS AND THE LIKE
Filed July 1, 1963 2 Sheets-Sheet 1
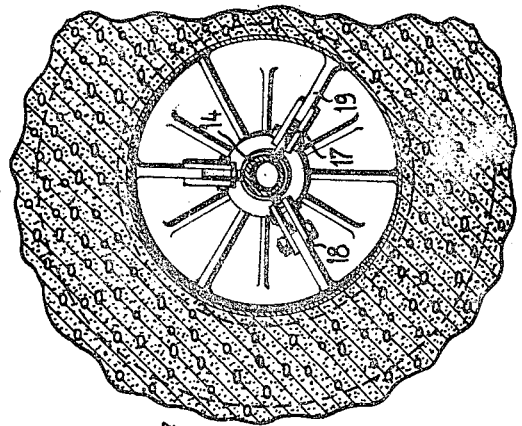
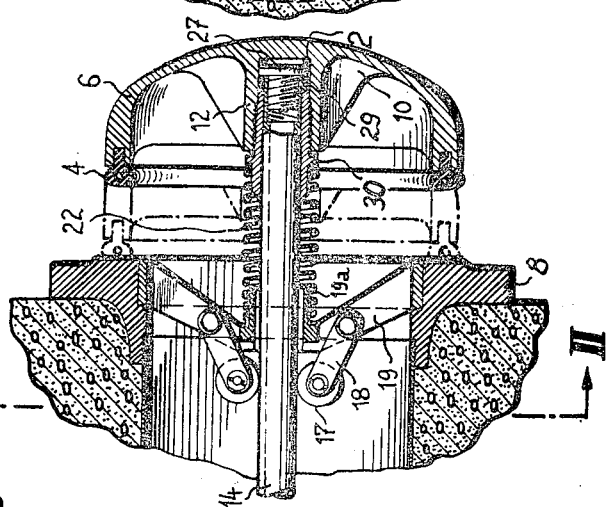
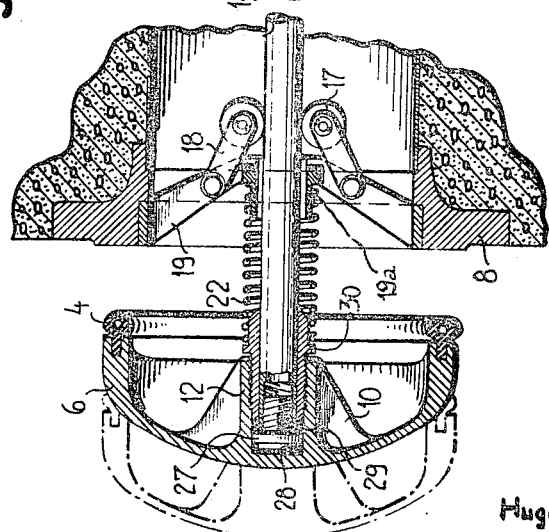
INVENTOR.
Hugo Rickenbach
BY Werner W. Kleeman
ATTORNEY

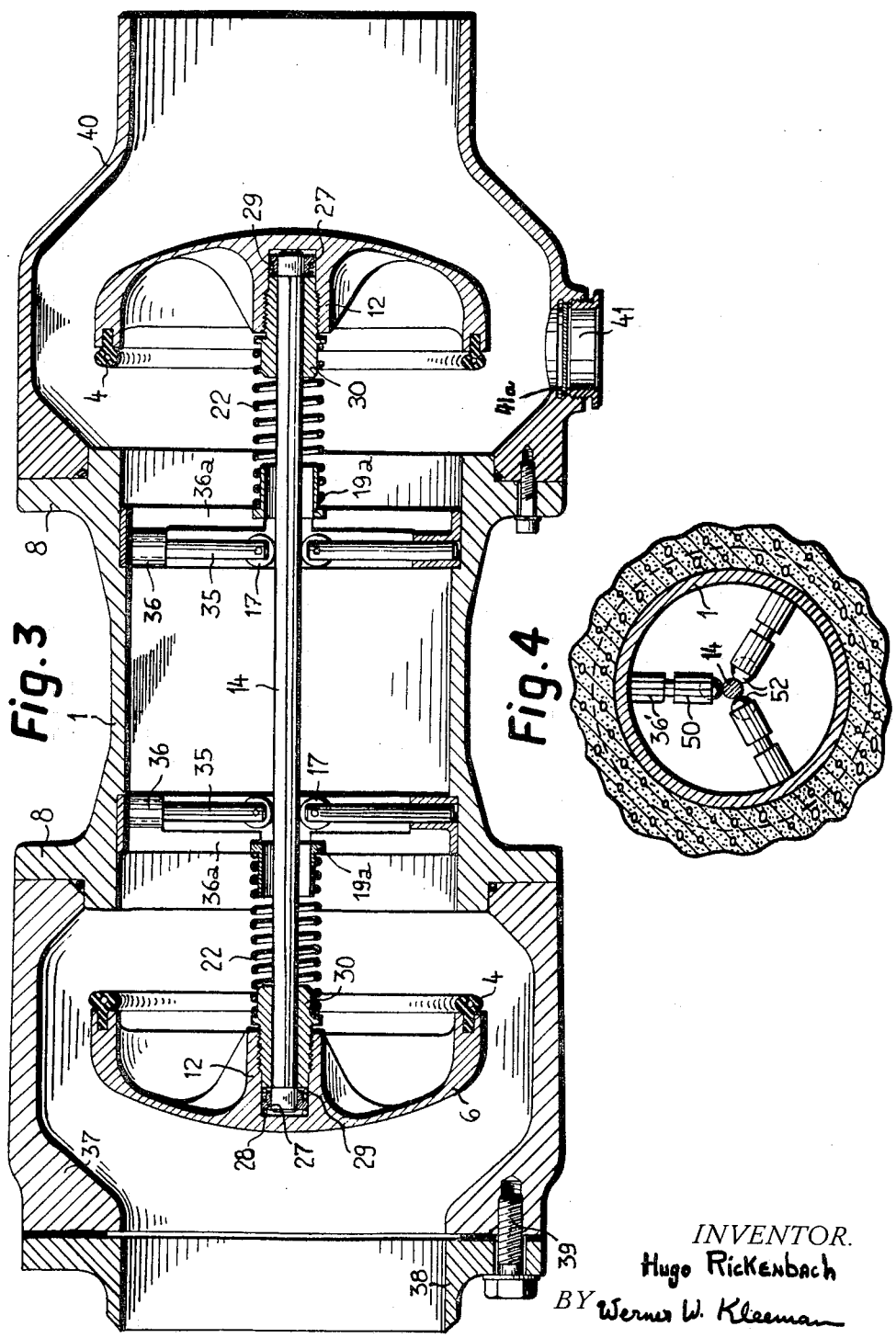

United States Patent Office 3,223,020
Patented Dec. 14, 1965

1

3,223,020
VALVE MECHANISM PARTICULARLY ADAPTED
FOR SHELTERS AND THE LIKE
Hugo Rickenbach, Lindenstrasse 77,
St. Gallen, Switzerland
Filed July 1, 1963, Ser. No. 291,812
13 Claims. (Cl. 98—119)

The present invention relates to improvements in valves for shelters and the like, particularly adapted for closing a tubular ventilating duct in the event of overpressure or suction, conveniently termed herein pressure impulses.

Various devices are already known to the art for ventilating shelters, for example air-raid shelters. One of these ventilating arrangements remains permanently open, but produces a sufficiently large pressure drop in order to eliminate any possible damaging effects of shock waves. However, these arrangements also have a considerable inherent resistance to air circulation.

Another type of ventilating device closes only in the event of a shock wave. However, the heretofore known devices have not been satisfactory, either because of their inertia, or because they were incapable of withstanding the shock waves occurring with atomic explosions. Conditions are further complicated by the fact that the valve is not only exposed to a sudden increase in pressure, but that the pressure wave is followed with a few seconds' delay by a suction wave which may effect the occupants of the shelter in the same unfavorable manner as the shock wave.

The present invention therefore has as one of its primary objects to eliminate these drawbacks.

Another important object of the present invention is to provide an improved valve arrangement for closing a tubular member, particularly for the ventilating duct of shelters and the like, which is capable of quickly responding to the presence of pressure impulses for quick closing of such tubular member, is of relatively simplified construction so that the dangers of malfunction are considerably minimized, yet quite robust so that it can withstand exposure to considerable pressures.

A further impotant object of the present invention is the provision of an improved valve arrangement which is highly reliable in operation, economical to manufacture and service, easy to install, quick-acting, and possessing relatively few moving parts so that the danger of breakdown is considerably minimized.

Still a further object of this invention is the provision of an improved valve structure, particularly for air-raid shelters, adapted to close a tubular ventilating duct in the event of pressure impulses wherein the closing valve means are supported in a manner affording very little resistance to closure movement of the closing valve means, thereby providing quick-action valve response.

Yet a further important object of the present invention is to support an interconnecting rod member for spaced closure discs of a valve arrangement by means providing point or line contact with said rod member, so that the closure discs can quickly and easily assume a desired position.

Another important object of the present invention is

2 to provide an improved valve arrangement for shelters or like structures adapted to close an open-ended, hollow body member in the event of over-pressure or suction, comprising a closing member arranged at each open end of the body member, a connecting rod for operably interconnecting the closing members with one another, wherein these closing members in their so-termed inoperative position are normally spaced from the associated open end of said body member, and means for supporting the connecting rod for unimpeded sliding movement axially of the aforesaid body member, to permit alternate closure of the open ends of the body member by the associated closing member in the presence of pressure impulses.

Broadly speaking, and according to a preferred manifestation of the present invention, closing means or discs are provided at both ends of a hollow body member, conduit, tube or the like, said closing means being interconnected by at least one rod located to be axially movable and slidably supported by means of supporting members disposed within the hollow tube or conduit, and which effectively enable an alternative closure of the tube in the event of pressure impulses. The supporting members are advantageously so constructed and arranged that they provide a point or line contact with the connecting rod so that a minimum resistance to axial displacement of the aforesaid rod is present, thereby providing for quick-action closing of the tube or conduit.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings wherein like reference numerals generally denote similar elements:

FIGURE 1 is a vertical cross-sectional view of a first preferred form of valve designed according to the present invention;

FIGURE 2 is a cross-sectional view of the valve of FIGURE 1, taken along lines 2—2 thereof;

FIGURE 3 is an axial cross-sectional view of another embodiment of valve designed according to the teachings of the present invention; and FIGURE 4 is a cross-sectional view, similar to FIGURE 2, of a variant form of valve structure.

Referring now to the drawings and, more particularly to FIGURES 1 and 2, there is schematically depicted the brickwork M of an air-raid shelter or like structure. A hollow body member or the like, here illustrated as an open metal conduit or pipe 1 is firmly located in the brickwork M. In the illustrated embodiment, this conduit or pipe 1 is open at both of its ends, as shown, and is provided with lateral end portions or flanges 8.

Two valve discs or plates 6 are operatively interconnected by a common connecting rod 14, so that such valve discs 6 may be alternatingly moved to rest against either end face of the flanges 8. Since both of the valve discs 6 and the support arrangement therefor are identical in structure, only one side of the valve assembly will be discussed in detail hereinafter. The face of each valve disc 6 confronting its adjacent flange 8 is provided or fitted with a sealing ring 4, as shown. The mounting of the valve discs 6 upon the connecting rod 14 is such that under normal conditions both valve discs 6 are spaced a suitable distance from the adjacent, confronting end faces of the respective flanges 8, as depicted in full lines in FIGURE 1, thereby allowing for the uninhibited circulation of air. When a pressure impulse appears at one of the valve discs 6, then such is forced in sealing relation against the associated flange 8, whereas the other valve disc is then moved further away from its confronting flange. This condition is shown for example in phantom lines in FIGURE 1, wherein one valve disc 6, i.e. the right-hand valve, is shown seated against its confronting flange 8, with the other valve disc then being further displaced from its associated flange 8.

The valve discs 6 provided for selectively closing the ends of the conduit or pipe 1 are advantageously arched toward the outside, being concave on the inside, with each having radial reinforcing ribs 10 starting from their respective hubs or centers 12 (see FIGURE 1). The connecting rod 14 is slidably mounted or supported at suitable locations, for example adjacent the ends of the conduit or pipe 1 by rollable elements such as rollers 17 which, in turn, are located in carrying arms or supports 18 arranged at opposite ends of the conduit 1. These arms 18 arranged in groups at each end of the pipe 1 are provided with supporting members 19 extending radially inwardly towards the connecting rod 14, with such supporting members 19 at each pipe end serving to support a sleeve 19a for carrying a spiral or helicoidal spring 22, as shown. The other end of these helicoidal springs 22 bear against the associated hub 12 of the closing valve disc 6. Due to these springs 22 the associated valve discs 6 are held in their normal, so-termed inoperative position in spaced relationship relative to the respective adjacent confronting end or flange 8 of the conduit 1. The gaps or spaces formed between these valve discs 6 and the confronting flanges 8 are always substantially equal when such valve discs 6 assume their normal inoperative position indicated with solid lines.

The connection between the connecting rod 14 and the valve discs 6 is advantageously not rigid but resilient. To this end, the opposed ends of the connecting rod 14 are each provided with an annular projection 27 resting on both sides against resilient ring members 28, 29 advantageously formed of rubber or the like. These resilient ring members 28 and 29 are retained in a suitable bore provided in the hub 12 by means of a threaded cap or bush member 30. These resilient ring members 28, 29, prevent damage to the bearings which might occur in consequence of the kinetic energy during the impact of shock waves against one of the valve discs 6.

Since the easy unimpeded movement of the valve discs 6 is of paramount importance in order to ensure for quick valve response, the mounting of the connecting rod 14 is very important. Each end of the connecting rod 14 is slidably supported by a group of bearing members, in the illustrated embodiment being three in number, wherein each bearing member is equipped with a roller 17 rotatably mounted on an associated fork or bifurcated arm or support member 18, as shown. The three rollers 17 are substantially equiangularly spaced about the interior of the pipe or conduit 1, but it is also possible to employ a different number of such rollers. The resulting point contact of these rollers 17 with the connecting rod 14 ensures for easy and unretarded movement of the aforesaid connecting rod. The construction is such that there is provided a small amount of clearance between these rollers and the connecting rod so that even in the event of blockage of the rollers a relative movement is possible between the connecting rod 14 and these rollers 17. It is to be appreciated that the other end of the connecting rod 14 is likewise provided with three support members of similar construction and having a similar arrangement of angularly spaced rollers.

In FIGURE 3 there is shown a variant form of valve arrangement, which for the most part, however, is quite similar to the valve assembly of FIGURES 1 and 2, with like reference numerals generally denoting similar elements. The valve arrangement illustrated in this embodiment is particularly adapted to be incorporated in the ventilation ducts of water supply plants or the like. As such, and for this purpose, an annular hood 37 and 40 is seated on the respective flanges 8 of the conduit 1 and extends circumferentially about the associated valve disc 6. The right-hand hood or cover member 40 is further provided with an opening 41a receiving therein a member 41 providing a viewing window for inspection of the interior of the valve assembly. The other hood member 37 has connected thereto a ring flange 38 by means of threaded screw means 39 permitting connection of further conduits at such end. In this embodiment, the connecting rod 14 is guided by a somewhat different arrangement. The roller elements 17 are each carried by a bifurcated arm member 35 which, in turn, is supported by a bearing support unit 36 having inwardly directed arms 36a carrying the respective sleeve member 19a for the associated spiral spring 22, as shown. In all other respects the valve structure of FIGURE 3 is substantially similar to that previously described with reference to FIGURES 1 and 2.

In FIGURE 4 there is depicted a modified form of support arrangement for the connecting rod 14 arranged for sliding movement within the conduit 1. In this embodiment there is provided a number of bearing supports 36' spaced about the connecting rod 14, with each such bearing support 36' carrying a ball cup 50 in which rollable elements such as the spherical ball members 52 are located. It will be appreciated that a similar arrangement of ball cups 50 and ball rollers 52 is provided at the other end of the connecting rod 14. It is also possible to provide journal bearings making contact with the connecting rod 14 only along a portion of its circumference, that is to say, line contact.

Tests have shown that such type valves are capable of withstanding both suction and pressure waves, and that the closing periods varied between 0.003 second and 0.01 second, according to the pressure. This quick-action closure is particularly important in order to prevent shock waves from being propagated into the interior of the shelter.

In spite of the short closing travel of the valve of about only 2″, owing to the unavoidable inertia of the valve a breakthrough of a partial shock wave must be anticipated, but this will impinge on the concave shape of the inner valve disc and thus accelerate the closing movement.

In order to provide maximum possible safety, the valve discs 6 are dimensioned for a maximum pressure differential of about 710 p.s.i. During the subsequent suction, the valve operates similarly, but in the opposite direction. After the pressure conditions have returned to their normal values, the springs 22 return the valve discs 6 into their inoperative position.

The installation is effected conveniently in the horizontal position, although, with suitable dimensioning of the springs 22 the installation may also be vertically arranged. However, in this latter case the lower spring must also additionally absorb the weight of the connecting rod 14 and that of the valve discs 6. It will be appreciated that the guide and support arrangement for the connecting rod 14 is advantageously so constructed that a minimum of frictional resistance to movement of such rod is present.

While there is shown and described present preferred embodiments of the invention, it is to be distinctly understood that the invention is not limited thereto but may be otherwise variously embodied and practised within the scope of the following claims.

Having thus described the present invention, what is desired to be secured by United States Letters Patent, is:

1. A valve arrangement for shelters or the like for closing a ventilating conduit in the event of overpressure or suction, comprising a valve disc arranged at each end and outside of said ventilating conduit, a connecting rod extending axially of said ventilating conduit for operably interconnecting said valve discs with one another, spring means for holding said valve discs in their inoperative position normally spaced from the associated end of said ventilating conduit to provide an unobstructed flow passage through said ventilating conduit, means for supporting said connecting rod for sliding movement axially of said ventilating conduit permitting alternate closure of the ends of said ventilating conduit by the associated valve discs in dependence upon pressure impulses acting upon said valve discs.

2. A valve arrangement for shelters or the like for closing an open-ended, tubular ventilating conduit in the event of overpressure or suction, comprising a valve disc arranged at each of the open ends of the tubular conduit, a connecting rod located internally of the tubular conduit for interconnecting said valve discs with one another, said valve discs in their inoperative position being normally spaced from the associated open end of said tubular conduit to provide an unobstructed flow passage through said tubular conduit, spring means cooperating with said valve discs for normally maintaining said valve discs in said inoperative position in which both ends of said tubular conduit are open, means for supporting said connecting rod for sliding movement axially within said tubular conduit permitting alternate closure of an open end of said tubular conduit by the associated valve disc in the presence of pressure impulses, said supporting means contacting said connecting rod about only a portion of its periphery to provide relatively small surface contact between said supporting means and said connecting rod, to ensure for unimpeded and quick closing action of said valve discs.

3. A valve arrangement according to claim 2 wherein each of said valve discs are dish-shaped, arching towards the outside and concave on the inside.

4. A valve arrangement according to claim 2 wherein a hood member is supported at each end of said tubular conduit which surrounds the associated valve disc.

5. A valve arrangement according to claim 2 including means for resiliently connecting the valve discs to said connecting rod.

6. A valve arrangement for shelters or the like for closing an open-ended, tubular ventilating conduit in the event of overpressure or suction, comprising a valve disc arrangement at each of the open ends of the tubular conduit, a connecting rod located internally of the tubular conduit for interconnecting said valve discs with one another, said valve discs in their inoperative position being normally spaced from the associated open end of said tubular conduit to provide an unobstructed flow passage through said tubular conduit, spring means cooperating with each of said valve discs for maintaining said valve discs in said inoperative position in which both ends of said tubular conduit are open, means for supporting said connecting rod for sliding movement axially within said tubular conduit permitting alternate closure of an open end of said tubular conduit by the associated valve disc in the presence of pressure impulses, said supporting means for said connecting rod including rollable elements.

7. A valve arrangement according to claim 6 wherein said rollable elements are roller members.

8. A valve arrangement according to claim 6 wherein said rollable elements are ball members.

9. A valve arrangement for closing an open-ended conduit in the event of overpressure or suction, comprising a valve disc arranged at each end and outside of said open-ended conduit, a connecting rod extending axially of said open-ended conduit for operably interconnecting said valve discs with one another, spring means for holding said valve discs in their inoperative position normally spaced from the associated end of said open-ended conduit to provide an unobstructed flow passage through said open-ended conduit, means for supporting said connecting rod for sliding movement axially of said open-ended conduit permitting alternate closure of the ends of said open-ended conduit by the associated valve discs in dependence upon pressure impulses acting upon said valve discs, and a hood member surrounding each valve disc and connected with the associated end of said open-ended conduit.

10. In combination, a hollow, open-ended body member, a valve disc associated and arranged at each end of the body member, a connecting rod for interconnecting said valve discs with one another, said valve discs in their inoperative position being normally spaced from the associated open end of the body member thereby providing an unobstructed flow passage through said body member, spring means cooperating with said closing members for normally maintaining said closing members in their inoperative position in which both ends of said body member are open, means, fixedly carried by said body member for supporting the connecting rod for sliding movement axially of the body member, to permit alternate closure of the open ends of said body member by the associated valve disc in the presence of pressure impulses, said supporting means connecting said connecting rod about only a portion of its periphery to provide relatively small surface contact between said supporting means and said connecting rod, to ensure for unimpeded and quick closing action of said valve discs.

11. In combination, a hollow, open-ended body member, a valve disc associated and arranged at each end of the body member, a connecting rod for interconnecting said valve discs with one another, said valve discs in their inoperative position being normally spaced from the associated open end of the body member thereby providing an unobstructed flow passage through said body member, spring means cooperating with said valve discs for normally maintaining said valve discs in their inoperative position in which both ends of said body member are open, means for supporting the connecting rod with point contact for sliding movement axially of the body member, to permit alternate closure of the open ends of said body member by the associated valve discs in the presence of pressure impulses.

12. In combination, a hollow, open-ended body member, a valve disc associated and arranged at each end of the body member, a connecting rod for interconnecting said valve discs with one another, said valve discs in their inoperative position being normally spaced from the associated open end of the body member to provide an unobstructed flow passage through said body member, spring means cooperating with said valve discs for normally maintaining said valve discs in their inoperative position in which both ends of said body member are open, means for resiliently mounting said valve discs to said connecting rod, means for supporting the connecting rod for sliding movement axially within the body member against relatively small frictional resistance, to permit alternate closure of the open ends of said body member by the associated valve disc in the presence of pressure impulses, said supporting means including at least one group of rollable elements.

13. In combination, a hollow, open-ended body member, a valve disc associated and arranged at each end of the body member, a connecting rod for interconnecting said valve discs with one another, said valve discs in their inoperative position being normally spaced from the associated open end of the body member thereby providing an unobstructed flow passage through said body member, spring means cooperating with said valve discs to hold the latter in said inoperative position in which both ends of the body member are maintained open, means for resiliently connecting each valve disc to the connecting rod, means for supporting the connecting rod for sliding movement axially of the body member, to permit alternate closure of the open ends of said body member by the associated closing member in the presence of pressure impulses, said supporting means including at least a first and second group of rollable elements disposed at spaced locations axially of the connecting rod, and rollable elements of each group being angularly spaced with respect to the circumference of said connecting rod to thus provide relatively small surface contact between said first and second group of rollable elements and said connecting rod to ensure for quick closing action of said valve discs.

References Cited by the Examiner
UNITED STATES PATENTS

| | | | |
|---|---|---|---|
| Re. 19,615 | 6/1935 | Samel | 137—516.25 |
| 1,793,193 | 2/1931 | Price | 137—516.25 |
| 3,139,811 | 7/1964 | Sickel | 98—119 |
| 3,140,648 | 7/1964 | Bergman et al. | 98—119 |

WILLIAM F. O'DEA, *Primary Examiner.*

JOHN F. O'CONNOR, *Examiner.*